Oct. 30, 1951  E. E. YOST  2,573,292
FUR CUTTING APPARATUS
Filed Oct. 13, 1945  4 Sheets-Sheet 1
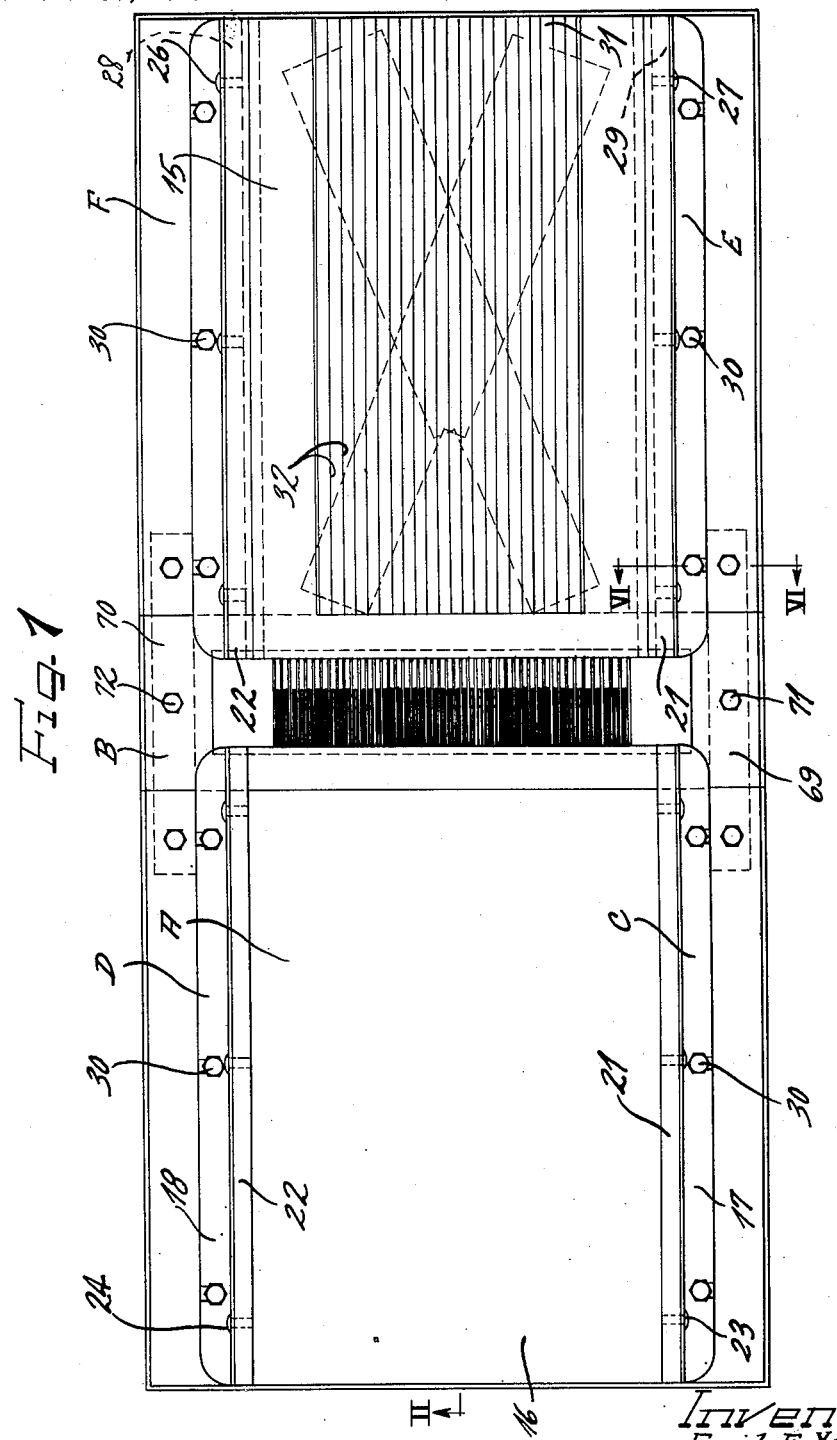
Inventor
Emil E. Yost

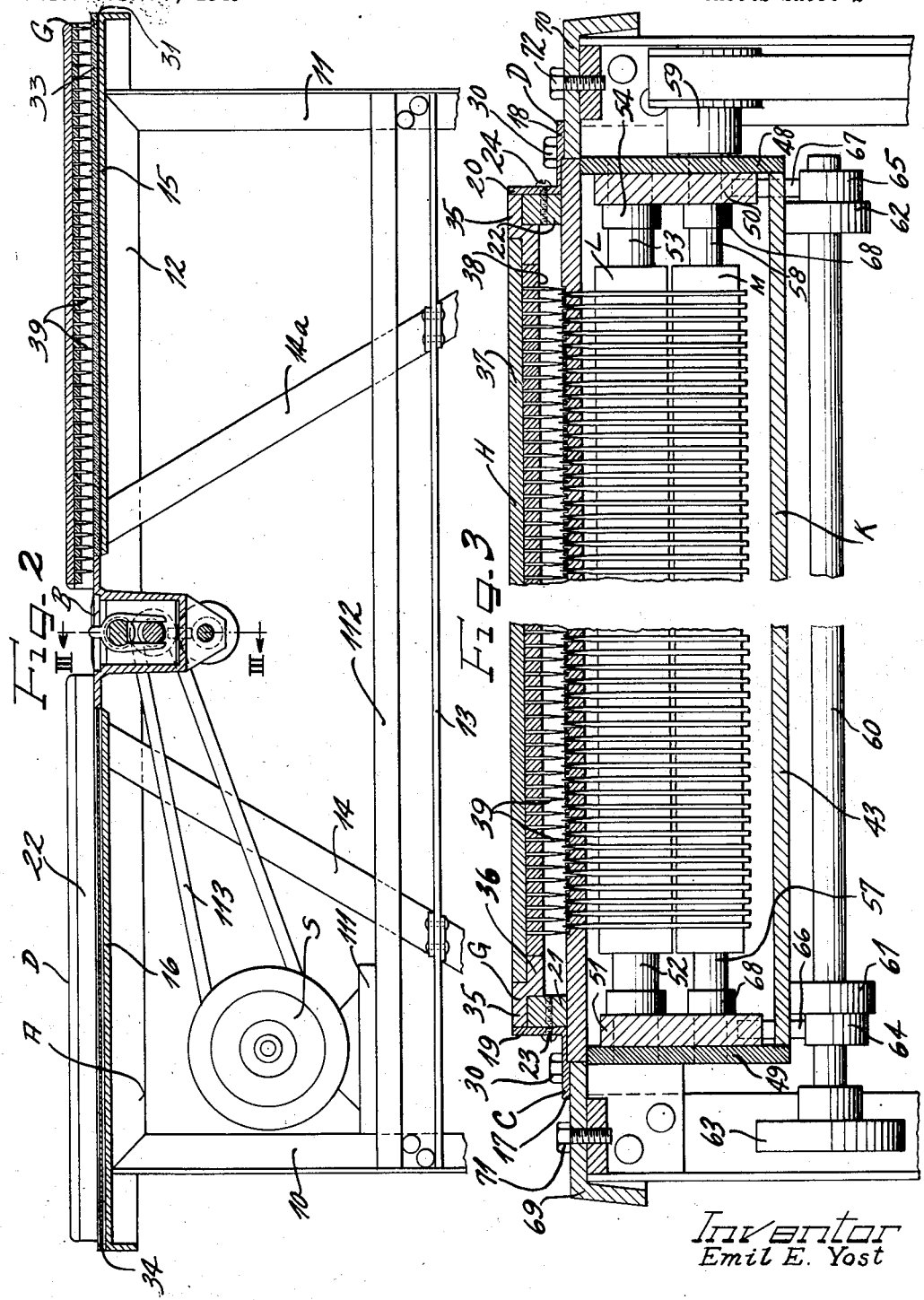

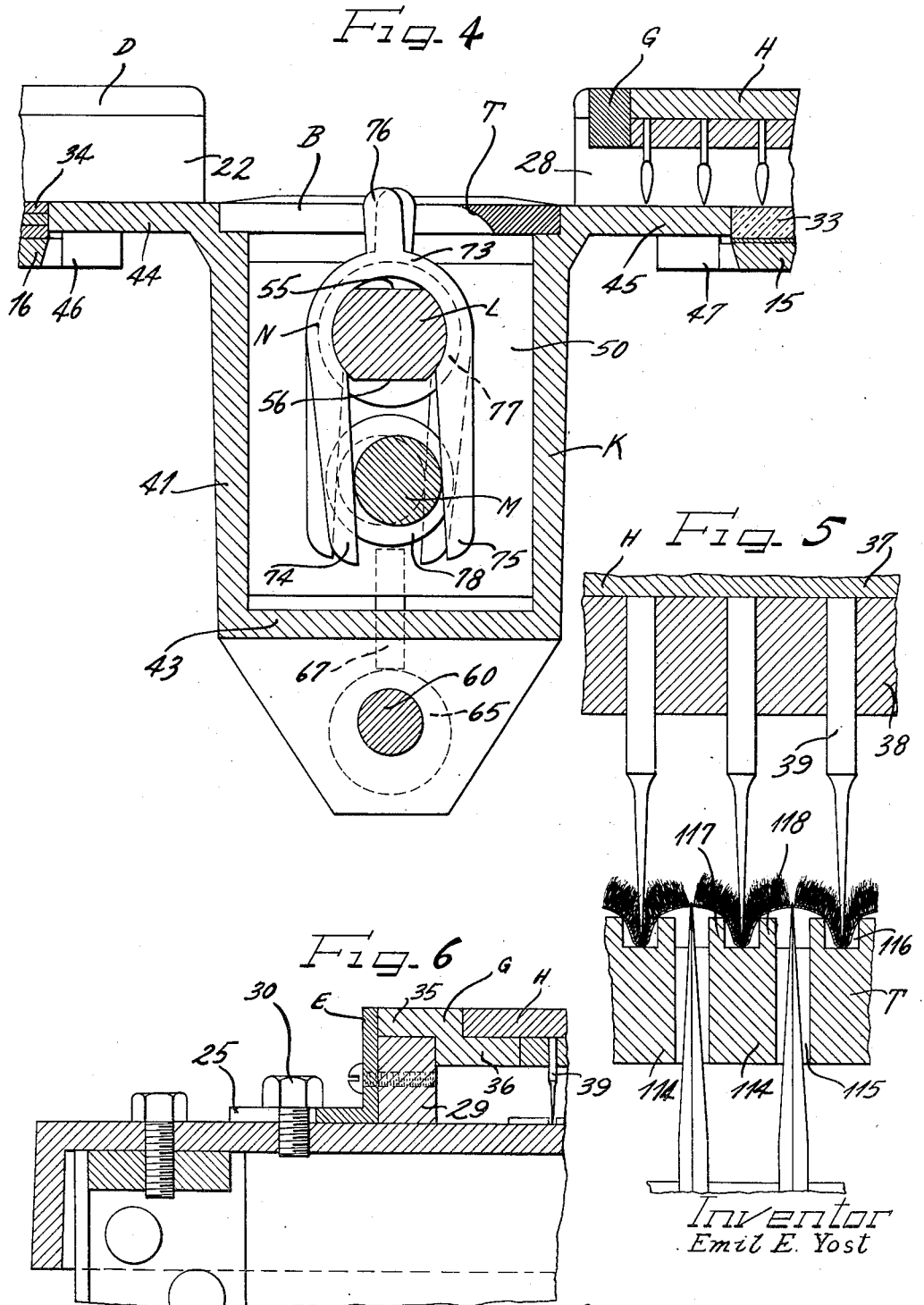

Oct. 30, 1951     E. E. YOST     2,573,292
FUR CUTTING APPARATUS
Filed Oct. 13, 1945     4 Sheets-Sheet 4
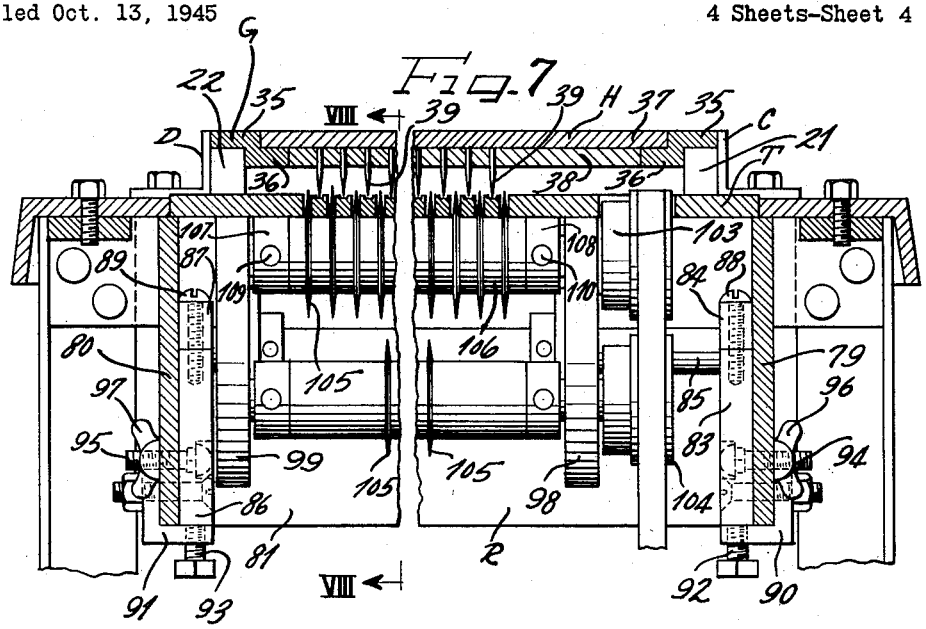
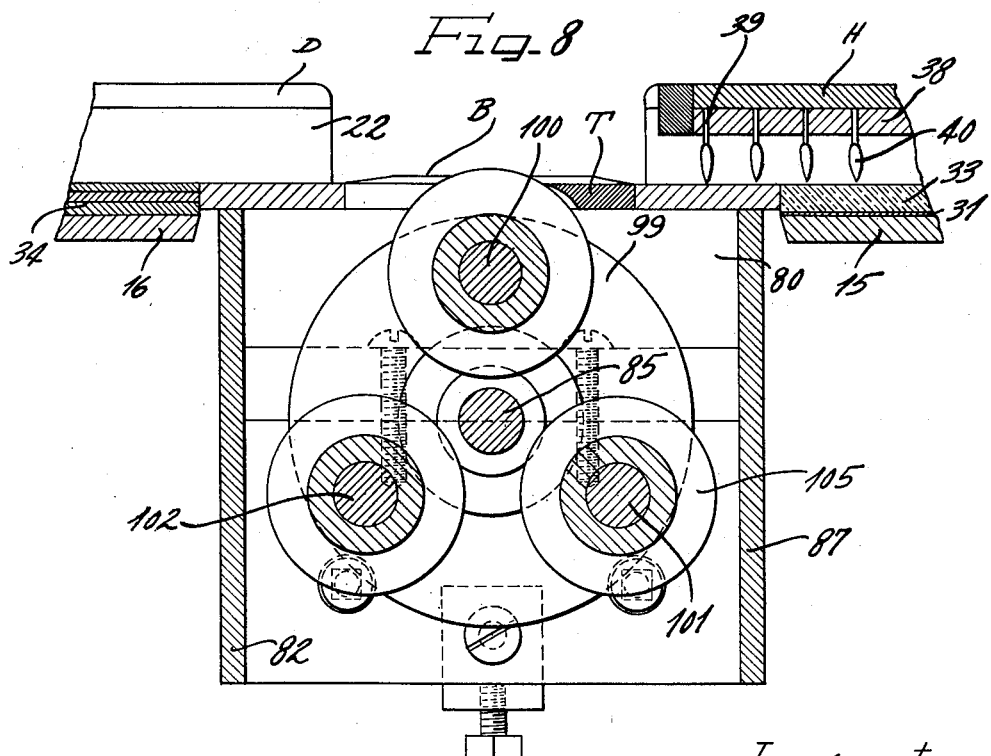
Inventor
Emil E. Yost Patented Oct. 30, 1951

2,573,292

UNITED STATES PATENT OFFICE 2,573,292

FUR CUTTING APPARATUS

Emil E. Yost, Chicago, Ill.

Application October 13, 1945, Serial No. 622,136

17 Claims. (Cl. 164—38)

The present invention relates to a fur cutting apparatus and more particularly to a machine for cutting pelts into narrow strips of exactly the same width, so that the narrow strips may be "dropped" and expeditiously sewed together, to form wide strips, to expedite manufacture.

In the manufacture of fur coats, from furs such as mink, skunk, raccoon, and the like, the pelts are "let out" or "dropped" by cutting the pelts into a plurality of narrow strips and moving one endwise with respect to another, and sewing the strips together end to end, to form a long strip to be assembled with others into a coat. Such narrow strips must be cut with the most accurate precision, and even the best of hand-cutters sometimes are unable to produce a plurality of strips of exactly the same width, thus requiring greater time in sewing the strips together by the sewing machine operator.

In cutting pelts, to form a plurality of narrow strips, it is important that the leather of the pelts be cut without cutting or damaging the hair or fur. To do this by hand requires a high order of skill.

It is therefore an important object of the present invention to provide a machine to precision cut pelts to furnish strips for "dropping," which strips are all exactly the same width.

Another object of the present invention is to provide a fur cutting machine for cutting pelts into strips which are of the same width so that the sewing of the strips may be expedited, as the hazard of uneven edges, which the sewing machine operator would otherwise have to expect and to take into account during the sewing operation, is eliminated.

A further object of the present invention is to provide a fur cutting machine which cuts the leather of the pelts without injuring the hair or fur.

A further object of the present invention is to provide a fur cutting machine in which the cutting blades may be quickly replaced, if dull or broken, with a minimum loss of time.

The invention has for an additional object the provision of a fur cutting machine in which the pelts are stretched transversely during the cutting operation to cause separation of the hair or fur along the lines of cut.

Another and further object of the present invention is to provide a fur cutting machine in which one type of cutter blade may be substituted for another type of blade with a minimum time loss.

An additional object of the present invention is to provide a fur cutting machine which interchangeably uses circular or oscillatable cutting blades.

Another and further object of the present invention is to provide a fur cutting machine for cutting pelts into narrow strips, so arranged that the pelts may be advantageously placed on a machine, held in selected position, and cut into strips, all in a minimum amount of time.

The above, other and further objects of the present invention will be apparent from the following description and accompanying drawings.

Embodiments of the present invention are illustrated in the accompanying drawings and the views thereof are as follows:

Figure 1 is a top plan view of the machine, showing in dotted lines two half skins or pelts arranged in a manner to produce the greatest number of narrow strips with a minimum amount of waste;

Figure 2 is a vertical central sectional view of the machine taken on the plane indicated by line II—II of Figure 1;

Figure 3 is a fragmental enlarged vertical sectional view taken in the plane III—III of Figure 2, with the needle board and its carrier moved to the left, part way of the length of the table;

Figure 4 is an enlarged vertical sectional view taken transversely through the shaft well of the machine, and showing two oscillatory cutting blades, and indicating the range of oscillatory movement of the blades;

Figure 5 is an enlarged fragmental sectional view showing, in somewhat exaggerated form, the manner of moving the pelts over the cutting blades and showing the separation of the hair or fur along the line of cut;

Figure 6 is a fragmental enlarged vertical sectional view taken on the plane of line VI—VI of Figure 1;

Figure 7 is a fragmental vertical sectional view, with parts in elevation, showing in a modification the rotary cutting blade of the present invention and the manner of operating and supporting the same;

Figure 8 is a vertical sectional view taken in the plane of the line VIII—VIII of Figure 7.

The drawings will now be explained.

The machine of the present invention is illustrated as including a table, designated generally as A, having legs 10 and 11, horizontal frame members 12, and intermediate braces 13. Diagonal braces 14 and 14a are provided connected to the upper frame members 12, intermediate braces 13, and the lower portions of the table section, not shown.

The top of the table comprises two sections, section 15, the loading section, and section 16, the delivery section. The adjacent ends of the sections 15 and 16 are spaced as shown in Figure 2 to define what is herein termed a cutting zone B.

Along the side margins of the top section 16, and laterally spaced apart, are two channel members C and D arranged with the horizontal flanges 17 and 18 thereof against the surface of the section 16 and with the vertical flanges 19 and 20 upstanding. Secured to the upstanding flanges 19 and 20 are rails 21 and 22 secured in place by screws 23 and 24. It will be noted that the top surfaces of the rails lie below the top margins of the vertical flanges 19 and 20.

Attached to the side margins of the section 15 are similar channels E and F, channel E being in alignment with channel C, and channel F in alignment with channel D. Attached to channel F is rail 28, in alignment with rail 22 and attached to channel E is a similar rail 29 in alignment with the rail 21.

The horizontal flanges of the flanged members C, D, E and F are slotted at 25, at intervals in their lengths, to receive bolts 30 to attach the flanges in place on the top sections.

The rail 28 is secured to the flange F by screws 26 while the rail 29 is secured to the flange E by screws 27.

On top of the section 12 is a sheet 31 of paper or the like having thereon a plurality of parallel lines 32 arranged, as shown in Figure 1, as extending lengthwise of the table, and herein termed a skin chart. These lines 32 are $\frac{1}{16}$ of an inch apart for a purpose to be later explained.

Overlying the sheet 31 is a plate 33 of glass or other transparent material. On top of the delivery section 16 are plies 34 of cardboard or similar material. As is shown in Figure 2, the surface of the topmost ply 34 is flush with the upper surface of the plate 33. The cardboard plies 34 are co-extensive with the length of the section 16 and also with the width between the rails 21 and 22.

Referring to Figures 2, 3 and 7, a carrier G is slidably mounted on the rails. The carrier comprises a rectangular frame having upper and outer flanges 35 and lower and inner flanges 36. The flanges are arranged in Z formation in sections as may be seen in Figures 3, 6 and 7. Supported in the carrier G is a needle or pin board H formed, as illustrated, of two-ply construction, although not limited to such construction. The upper ply 37 fits within the inner margin of the carrier G and rests on the upper surfaces of the lower flanges 36, while the lower ply 38 fits within the margins of the lower flanges 36, as clearly shown in Figures 3 and 7. Supported in the lower ply 38 are a plurality of rows of needles or pins 39. The lengths of the pins 39 are such that the pins may be firmly embedded in the needle board H with their points resting lightly against the upper surface of the plate 33. Preferably, although not necessarily, the points of the needles 39 are oblate in side elevation, as may be seen at 40 in Figure 8. The front and rear margins of the points are sharpened so that when the carrier with the needle board H in it is applied to the table, the points of the pins 39 will enter the leather of a pelt or skin on the plate 33.

The carrier G, with the needle board H in it, is movable lengthwise of the table, on the rails. In the cutting zone B cutting mechanism of the present invention is installed.

Referring to Figures 2 and 4, the cutting mechanism therein illustrated comprises a plurality of oscillatable blades, means for supporting them, and means for oscillating them.

An elongated box herein designated as the shaft well K is removably supported in the cutting zone B.

Figure 4 shows the well K as comprising side walls 41 and 42, a bottom wall 43, and marginal flanges 44 and 45. The flanges rest on suitable brackets 46 and 47 fixed to the frame work of the table. When the well K is in place, the upper surfaces of the flanges 44 and 45 are flush, respectively, with the upper surfaces of the transparent plate 33 and the uppermost ply 34 of the cardboard pile.

Attached to the ends of the well K are end plates 48 and 49. Against the inner surface of the end plate 48 is a bearing block 50 while against the inner surface of the end plate 49 is a bearing block 51. A shaft L having reduced end portions 52 and 53 is carried by the blocks 50 and 51. Collars 54 are around the ends 52 and 53 of the shaft, being held therearound in fixed relation by suitable set screws. The collars 54 regulate the endwise adjustment of the shaft L with respect to bearing blocks 50 and 51. The major portion of the length of the shaft L has two diametrically opposed parallel flat surfaces 55 and 56. The surface of the shafts, between the flat surfaces 55 and 56, is cylindrical. Within the well K and below the shaft L is a second shaft M having the reduced end portions 57 and 58. The end portion 57 is supported by the block 51. The end portion 58 extends through the block 50 and through the end plate 48 supporting at its outer end a pulley 59. Below the bottom 43 of the well K is a rod 60 carried in bearings 61 and 62 suitably secured to the bottom 43, which rod has at one end a hand wheel 63. On the rod 60 adjacent the bearing 61 is a cam 64. On the rod 60 adjacent the bearing 62 is a cam 65. Movable through the bottom 43 of the well K and provided with suitable packing means for preventing escape of oil are vertically movable pins 66 and 67, resting on the cams 64 and 65. Pin 66 is entered in a bore in the block 51, and the pin 67 is entered in a bore in the block 50. As the rod is turned, by means of the hand wheel 63, the pins 66 and 67 are raised, or lowered, to adjust vertically the shafts L and M, with respect to the surface of the table top, for a reason to be later explained.

Collars 68 are fastened to the end portions 57 and 58 of the shaft M, to position it lengthwise in the well K.

The well K is engaged against its ends by plates 69 and 70, secured by bolts 71 and 72 to the frame structure of the table.

The oscillatable cutters N are shown in elevation, in Figure 4, as substantially of U shape, having a central portion 73 and parallel legs 74 and 75 which are spaced as shown. Projecting from the central portion 73 is a knife or cutter 76, having its edge portion sharpened. The cylindrical surface of the shaft L is formed with a plurality of parallel recesses 77 which are at right angles to the axis of the shaft. These recesses are spaced $\frac{7}{32}$ of an inch apart. The oscillatable blades or knives N are set to enter such recesses, and are spaced from one to another along the length of the shaft L. The shaft M is formed with a like number of recesses 78. These, however, are of full circular formation. The bottoms of the recesses, of two adjacent recesses of the shaft M, are offset, diametrically of the shaft, which may be observed in Figure 4, so as to oscillate the blades N whenever the shaft M is rotated. With this arrangement, any two adjacent blades N oscillate in directions opposite to each other.

The well K is supplied with a lubricant, for splash lubrication of the blades N, as the shaft M is rotated. It is to be understood that the opening in the end wall 48 for the shaft end 58 and the openings in the bottom 43 of the well for the pins 66 and 67 are provided with suitable means for preventing escape of oil from the well. These means have not been shown as they form no part of the present invention.

Instead of using oscillatory knives or blades, as heretofore described, circular blades may be used.

Referring to Figures 7 and 8, a box-like frame structure R having side walls 79 and 80 and end walls, 81 and 82, may be substituted for the shaft well K. When so substituted it is suitably supported on the brackets 46 and 47 of the table section.

Against the inner surface of the side walls 79 of the frame R is a vertically slidable block 83 comprising, with its removable cap 84 a journal for one end of the shaft 85. Vertically slidable against the inner surface of the side wall 80 is a similar block 86 which its cap 87 provides a journal for the other end of the shaft 85. The caps 84 and 87 are attached to the blocks by screws 88 and 89. Attached to the side walls 79 and 80 are angle brackets 90 and 91, each having a horizontal flange underlying the lower margin of the frame R. Threaded in the horizontal portion of the angle bracket 90 is a set screw 92 which bears against the lower edge of the block 83. Similarly threaded through the horizontal portion of the bracket 91 is a set screw 93 bearing against the block 86. Manipulation of the screws 92 and 93 determines the vertical position of the blocks 83 and 86. The blocks 83 and 86 are secured in vertically adjusted position by means of bolts 94 and 95 respectively, recessed within counterbores within the inner surfaces of the blocks and whose threaded portions project through suitable apertures in the side walls 79 and 80, and the threaded portions of which are provided with wing nuts 96 and 97, respectively, to be tightened when the blocks 83 and 86 have been adjusted.

The shaft 85 carries two axially spaced end members 98 and 99. Journalled in the end members 98 and 99 are three shafts, 100, 101 and 102, 120° apart. Similar ends of the shafts are journalled in the end plate 99, while the shafts project through the end plate 98, carrying at their projecting ends pulleys 103 on shaft 100, pulley 104 on shaft 102, and a similar pulley on shaft 101.

The shafts 100, 101 and 102 are equipped with circular cutting blades 105.

Referring to Figure 7, the shaft 100 is shown as provided with circular cutting blades 105 separated one from another by spacers 106. Collars 107 and 108 are removably attached to the shaft by means of set screws so that the spacers and blades on a shaft may be removed for sharpening or replacement of the blades, or to vary the axial distance between blades, as will be more fully explained.

In Figure 7, shaft 102 is shown as having circular cutting blades 105 arranged in an axial relation different from that shown with respect to the shaft 100.

The provision of the three blade carrying shafts is so that there may be sharpened blades available at all times during the cutting operation, or blades of different spacings may be set up at one time to be used at different times of operation.

It is apparent that the shafts on frame R are provided with a plurality of cutting blades and the operating mechanism therefor may be readily applied to or removed from the cutting zone B of the machine.

For operating the shaft M in the shaft well K, or any one of the shafts 100, 101 and 102, and in the frame R, a motor S is mounted on a base 111 carried by frame member 112 of the table construction. A belt 113 connects the motor shaft pulley with the pulley 59 of the shaft N for oscillating the blades of shaft L in well K and is connected to any one of the pulleys on the ends of the shafts 100, 101 and 102, of frame R as may be in the position of shaft 100 shown in Figure 8.

A comb board T is removably supported over the cutters to form a support for the pelt being moved along the table A.

The board T is provided with a plurality of teeth 114, spaced laterally, as at 115, to receive portions of the cutting blades.

The upper ends of the teeth 114 are grooved at 116, the grooves extending lengthwise of the table. The bottoms of the grooves 116 are flush with the upper surface of the plate 33, hence the margins 117 and 118 of the teeth defining these grooves project above the surface of the plate 33. This may be observed in Figures 2, 4, 5, 7 and 8.

The minimum distance, axially of a shaft, between cutting blades, is $\frac{7}{32}$ of an inch. Consequently, the spaces 115 between the teeth of the comb board are such as to receive the cutting blades, which are $\frac{7}{32}$ of an inch apart, and provide clearance between the sides of the teeth and the blades, as shown in Figure 5.

The rows of teeth 39, in the needle board H, register with the grooves 116 in the teeth 114 of the comb board.

The comb board is removably supported on the table, and as shown in Figure 1, its ends are against the angle members 69 and 70 of the cutting zone B.

The comb board thus is placed in position and is held in the machine.

To align the rows of needles 39 in the needle board the side flanges B, D, E and F may be adjusted, transversely of the table, by loosening the bolts 30 and moving the flanges in proper directions, which movement is possible because of the existence of the slots 25 in the horizontal members of the flanges. When the flanges have been adjusted laterally, in the manner stated, the bolts 30 are tightened thus holding fast the rails and the flanges. Thus movement of the carrier G and the needle board H along the rails will cause the needles 39 to travel midway of the grooves 116 in the top of the teeth 114 of the comb board T, as shown on Figure 5. Figure 6 illustrates a pin 39 aligned with a groove in the comb board with the tip or extremity of the needle midway of the width of the groove in the board.

In order to adjust the blade carrying shafts so that the blades will project midway between the spaces 115 between the teeth of the comb board, the shafts L and M of the shaft well K are adjusted by loosening the collars on the shafts, moving the shafts endwise in proper direction. When the blades thereon have been centered the collars are tightened thus holding the shafts against endwise movement during operation.

The circular cutters of Figures 7 and 8 may be adjusted in a similar manner.

It is highly essential that the pins move through the grooves 116 in the teeth, midway of the width, and that the cutting blades engage a pelt stretched over the spaces 115 between the teeth of the comb board midway of such spaces. In this manner strips of exactly the same width are cut from a pelt as it is moved over the cutting blades.

The operation of the machine is as follows:

With either type of cutter blades in cutting position in the cutting zone B, the skin or pelt is applied against the plate 33 and overlying the skin chart 31 and moved thereon so that the greatest number of strips may be cut from the pelt or skin. Figure 1 shows two half skins, in dotted lines, over the skin chart. Only one half-skin or pelt is applied and cut at a time.

When the skin or pelt has been positioned over the skin chart in a manner to produce the maximum number of usable strips, the carrier G with the needle board H is then applied to the rails 28 and 29, thus pinning the pelt against the plate 33. When the cutters are being operated, the carrier G with the needle board H is pushed along the table moving the pelt over the cutters with the needle holding the pelt in the bottom of the groove 116 of the comb board and stretching the portions of the pelt between these grooves over the margins 117 and 118 of the teeth so that the cutter cuts midway between the points of the pins. Figure 5 is exaggerated to show this action. Stretching of the pelt over the margins 117 and 118 of the teeth causes the hair or fur along the line of severance to separate to an extent that the cutting blades do not damage the hair or fur.

The cutting blades are so adjusted as to sever only the leather of the pelt and not damage the fur or hair.

It will be noted that the number of pins in a row on the needle board is sufficient so that several of the pins engage the pelt as it is moved across the comb board, thus preventing shifting of any portion of the pelt during the cutting operation.

During the cutting operation, with the shaft well K in place, the shaft L is turned by hand so that the surfaces 55 and 56 thereof are horizontal. This then retains the cutting blades N in the grooves 77 of the shaft L. Should it be necessary to remove any or all of the oscillating blades N, the motor is stopped, the comb board is removed, the shaft L is then turned by hand so that the flat faces 55 and 56 are vertical, whereupon any or all of the blades N may be removed by a lifting operation. This feature is important, because any blade that becomes dull may be quickly replaced or a whole set of blades may be replaced by a new set when the first set becomes dull. When the new blades have been inserted the shaft L is then turned by hand to bring the flat surfaces 55 and 56 into horizontal position.

Endwise adjustments of the shafts L and M are necessary so that the recesses 77 in the shaft L register with the recesses 78 in the shaft M.

After the pelt has passed the comb board, it is cut into a plurality of narrow strips, the minimum of which is $\frac{7}{32}$ inch per strip. The carrier with the needle board in it conveys these severed strips over the topmost ply of the pile of cardboard 34 whereupon the carrier is removed by hand and the top layer of cardboard removed, with the pelt strips on it. Another cardboard is applied and the operation repeated as many times as there are pelts to be severed.

With a machine of the present invention I can cut fifty mink skins into narrow strips within an hour's time. To cut the same number of skins, by hand, would require at least three days time. The strips cut with the present invention are all of equal width, with even margins, so that the sewing of the strips together may be expeditiously carried out on a fur sewing machine without the necessity of the operator having to look out for uneven ridges.

Whenever it is desired to cut strips wider than $\frac{7}{32}$ of an inch, cutters are removed, leaving only those necessary to cut the wider strips. The arrangement of the spaces 115 in the comb board and the recesses in the shafts L and M are all made to accommodate cutting blades $\frac{7}{32}$ of an inch apart, that is to say in multiples of $\frac{7}{32}$ of an inch.

The markings or lines 32 on the skin track 31 are, as before stated, $\frac{7}{16}$ of an inch apart. That is to say the distance between any two lines is double that of the distance between any two adjacent cutters.

It will be observed that the machine of the present invention is one which is very handy and convenient for cutting pelts or skins into narrow strips, the strips all being of the same width, having even marginal edges so that the sewing of the strip is greatly facilitated.

Furthermore, the ease with which any or all of the oscillatable blades may be removed and replaced reduce operating time, due to dull or broken blades, to a minimum.

The provision of a plurality of shafts carrying rotary blades reduces time loss to a minimum, due to dullness or breakage, as, if one set of blades becomes unsatisfactory by continued use, another set may be quickly presented in cutting position with a minimum loss of time.

The arrangement of the blades and the needle board in the manner stated makes it possible to accurately cut pelts into narrow strips, with the cuts being made through the leather without damage to the hair or fur.

The machine is to be sold with oscillating and circular blades. The oscillatory blades are used for cutting all light leather furs and the circular blades are used for cutting all thick leather furs.

The word "pelt" is used in this application to designate skin of a beast, especially of a sheep, goat or fur-bearing animal, and applies generally to an undressed or raw skin with the hair or wool on it.

The invention has been described herein more or less precisely as to details, yet it is to be understood that the invention is not to be limited thereby, as changes may be made in the arrangement and proportion of parts and equivalents may be substituted without departing from the spirit and scope of the invention.

I claim as my invention:

1. In a fur cutting machine, a plurality of oscillatable blades arranged at equal distances apart for cutting a pelt into a plurality of strips of equal widths, said blades having spaced parallel legs, a supporting shaft having a plurality of equally axially spaced surface grooves to receive said legs, a second shaft below said first shaft having a plurality of similarly spaced grooves to receive said legs, the bottoms of adjacent grooves of said second shaft being eccentrically arranged with respect to the shaft axis to oscillate said blades on said first shaft as said second shaft is rotated, and means for rotating said second shaft.

2. In a fur cutting machine, in combination, means for advancing a pelt slant-wise of the direction of movement, a plurality of blades equal distances apart to cut the pelt into strips of equal widths, means for actuating said blades, means for adjusting said blades to limit the extent of cut to the thickness of the leather of the pelt, and means for tensioning the pelt over the blades to separate the hair or fur along the line of cut.

3. In a fur cutting machine, in combination, means for advancing a pelt slantwise of the direction of movement, a plurality of blades spaced equal distances apart to sever the pelt in strips of equal width, means for adjusting said blades to limit the extent of cut to the thickness of the leather of the pelt, and means mounting said blades so that anyone may be removed without disturbing any of the other blades, means for operating the blades, and means for tensioning the pelt over the blades to spread the hair or fur along the line of cut.

4. A pelt cutting machine, comprising a table having a top comprising two spaced sections, a carrier movable along the table above the top, a needle board movable with the carrier, needles set in rows in said board to engage a pelt on said top, said table having means in said space providing a plurality of parallel slots with the lengths thereof in the direction of length of the carrier movement, means forming grooves between said slots with one groove between two adjacent slots, said grooves being aligned with the needle rows to receive the needle points as the carrier is moved along the table, and blades in said slots to sever a pelt into strips as it is moved by said carrier.

5. A machine for cutting pelts, comprising a table having a top consisting of two sections endwise spaced apart, rails lengthwise of said top, a carrier movable along said rails, a needle board supported by said carrier to move with it, needles arranged in rows in said board, a comb board removably supported in the space between said sections, and a plurality of blades supported below said comb board and arranged with a blade between every two adjacent comb teeth, and means for operating said blades.

6. A machine for cutting pelts, comprising a table having a top consisting of two sections endwise spaced apart, rails lengthwise of said top, a carrier movable along said rails, a needle board supported by said carrier to move with it, needles arranged in rows in said board, a comb board removably supported in the space between said sections, a plurality of blades supported below said comb board and arranged with a blade between every two adjacent comb teeth, the tops of the teeth being grooved in alignment with the rows of needles in said needle board to receive the needles as said carrier is moved for tensioning the pelts between said grooves, and means for operating said blades.

7. A fur cutting machine, comprising a table having a top consisting of two sections spaced endwise to provide a gap, a carrier movable along said top, a comb board supported in said top within said gap, a shaft well supported below said comb board, a blade supporting shaft mounted in said well, a plurality of blades supported by said shaft and arranged thereon at equally spaced distances to project between the teeth of said comb board, means for moving said shaft towards and away from the comb board to vary the depth of cut of said blades, and means for actuating said blades to cut a pelt moved along said comb board.

8. A fur cutting machine, comprising a table having a top consisting of two sections endwise spaced apart to provide a gap therebetween, a frame member insertable in said machine in said gap and supporting a shaft, said shaft having equally axially spaced surface grooves, a plurality of blades having spaced parallel legs to straddle said shaft and enter said grooves to space said legs along said shaft, said shaft having two diametrically disposed parallel flat faces the diametrical distance between which is slightly less than the distance between the legs of said blades whereby any blade may be removed from or applied to said shaft by a vertical movement when said shaft is turned so that its flat faces are vertical, a second shaft supported in said frame below said first mentioned shaft, said second shaft having annular grooves in register with the grooves of said first shaft to receive the blade legs when the blades are mounted on said first shaft, the bottoms of the grooves of said second shaft being eccentrically arranged with respect to the shaft axis to oscillate the blades on said first shaft as said second shaft is rotated, and means for rotating said second shaft.

9. A machine for cutting pelt fur, comprising a table having a top, rails extending lengthwise of said top, means supporting said rails for adjustment transversely of said top, a carrier movable along said rails, a needle board supported by said carrier to move with it, said needle board carrying a plurality of rows of needles, said top having a gap at mid length thereof, a comb board removably supported in said gap, the tops of the teeth of said comb board being grooved in the direction of the length of the top to receive the rows of pins on said needle board as said carrier is moved, the adjustment of said rails transversely of the top enabling alignment of the rows of needles on said needle board with the grooves in said comb board, a plurality of blades supported below said comb board and arranged with a blade between every two adjacent comb teeth, means for adjusting said blades to regulate the depth of cut, and means for actuating said blades.

10. A fur cutting machine, in combination, a table having a top comprising two sections endwise spaced apart to form a gap, rails extending lengthwise of said top, a carrier movable along said rails, a needle board supported by said carrier to move with it for moving a pelt along said top, a comb board removably supported in said gap, a frame structure removably supported by said machine in said gap, said frame structure carrying a spool, a plurality of shafts arranged in said spool with their axes parallel to the spool axis, said shafts carrying cutting blades, said blades being arranged in equally axially spaced relation on said shafts, means for rotating said spool to present the cutting blades on any of said shafts in cutting relation with the blades thereon extending through the slots in said comb board, and means for driving the shaft in cutting position.

11. A machine for cutting pelts, comprising a table having a top, said top consisting of two sections endwise spaced apart to provide a gap, a comb board removably supported in said gap, the tops of the teeth of said comb board having grooves therein with one groove to a tooth extending in the direction of the length of the table, rails lengthwise of said sections, means for adjusting said rails transversely of the top, a carrier movable along said rails, a needle board supported by said carrier and movable with it, said needle board carrying a plurality of rows of needles the tips of which lightly engage the surface of said table, the transverse adjustability of said rails enabling alignment of said carrier and needle board so that the rows of needles on said boards align with the grooves in the comb teeth as the carrier is moved along the top.

12. A machine for cutting pelts, comprising a table having a top, said top consisting of two sections endwise spaced apart to provide a gap therebetween, a comb board removably supported in said gap, a shaft supported below said comb board and carrying a plurality of cutting blades projecting through the spaces between the teeth of the board arranged with one blade per space, and means for adjusting said shaft endwise to position said blades midway of the widths of the spaces between said teeth.

13. A machine for cutting pelts, comprising a table having a top, said top consisting of two sections endwise spaced apart to provide a gap, a comb board removably supported in said gap, the tops of the teeth of said comb board having grooves therein with one groove to a tooth extending in the direction of the length of the table, rails lengthwise of said sections, means for adjusting said rails transversely of the top, a carrier movable along said rails, a needle board supported by said carrier and movable with it, said needle board carrying a plurality of rows of needles the tips of which lightly engage the surface of said table, the lateral adjustability of said rails enabling alignment of said carrier and needle board so that the rows of needles on said boards align with the grooves in the comb teeth as the carrier is moved along the top, and blades supported below said top and projecting through the spaces between the teeth of said comb board for cutting a pelt moved along said top by said needle board.

14. A machine for cutting pelts comprising a table having a top, said top consisting of two sections endwise spaced apart to provide a gap therebetween, a comb board removably supported in said gap, a shaft supported below said comb board and carrying a plurality of cutting blades projecting through the spaces between the teeth of the board arranged with one blade per space, means for adjusting said shaft endwise to position said blades midway of the widths of the spaces between said teeth, and means for vertically adjusting said shaft to regulate the depth of cut, and a needle board with depending needles movable along said top and engageable with a pelt thereon for moving said pelt over said blades, said comb board having grooves in alignment with the needles of said board whereby the pelt is tensioned over said teeth as it is contacted by said blade.

15. A machine for cutting pelts comprising a table having a top, said top consisting of two sections endwise spaced apart to provide a gap therebetween, a comb board removably supported in said gap, a shaft supported below said comb board and carrying a plurality of cutting blades projecting through the spaces between the teeth of the board arranged with one blade per space, a needle board guidably movable along said top with the needles down to engage a pelt on said top, the needles of said board being arranged in rows to straddle the cutting blades for moving the pelt over the blades, the straddle arrangement of the pin rows tensioning the pelts over the blades as the board is moved along said top.

16. In a machine for cutting pelts including a slidable needle board on which the pelts are held by needles with the fur side upward and a table top having slots through which cutter blades project for cutting the pelt as the needle board is slid thereover, the improvement which comprises a comb board having slots in alignment with the slots of the table and having raised teeth portions, said teeth portions being positioned between said slots and having grooves in their upper surfaces in alignment with the needles, whereby the portion of the pelt between adjacent needles will be tensioned over adjacent raised teeth portions when the needles move into said grooves for bending the fur away from the cutting zone during the cutting operation.

17. In a machine for cutting pelts including a slidable needle board on which the pelts are held by the needles with the fur side upward and a table top having slots through which cutter blades project for cutting the pelt as the needle board is slid thereover, the improvement which comprises means including a comb board with raised guide portions for contacting the pelt between said needles for bending the pelt into an arcuate position curved away from the cutting edge of the blade whereby the fur will be separated at the cutting zone to permit cutting of the pelt without injury to the fur.

EMIL E. YOST.

REFERENCES CITED

The following references are of record in the file of this patent:

UNITED STATES PATENTS

| Number | Name | Date |
|---|---|---|
| Re. 14,875 | Gates | June 8, 1920 |
| 179,645 | Cassidy | July 11, 1876 |
| 1,255,098 | Lewis | Jan. 29, 1918 |
| 1,619,305 | Norris | Mar. 1, 1927 |
| 1,898,647 | Teuscher | Feb. 21, 1933 |
| 2,120,920 | Masters | June 14, 1938 |
| 2,222,256 | Deutscher | Nov. 19, 1940 |
| 2,373,644 | Belch | Apr. 17, 1945 |

FOREIGN PATENTS

| Number | Country | Date |
|---|---|---|
| 433,000 | Germany | Aug. 19, 1926 |
| 519,729 | Great Britain | Apr. 4, 1940 |
| 863,760 | France | Apr. 9, 1941 |